(12) United States Patent
Dittrich et al.

(10) Patent No.: US 10,773,823 B2
(45) Date of Patent: Sep. 15, 2020

(54) STRUCTURAL ELEMENT

(71) Applicant: Airbus Defence and Space GmbH, Ottobrunn (DE)

(72) Inventors: Kay Dittrich, Ingolstadt (DE); Christian Karch, Neubiberg (DE)

(73) Assignee: AIRBUS DEFENCE AND AIR SPACE GMBH, Ottobrunn (DE)

(*) Notice: Subject to any disclaimer, the term of this patent is extended or adjusted under 35 U.S.C. 154(b) by 340 days.

(21) Appl. No.: 14/947,064

(22) Filed: Nov. 20, 2015

(65) Prior Publication Data

US 2016/0144976 A1 May 26, 2016

(30) Foreign Application Priority Data

Nov. 21, 2014 (DE) .................. 10 2014 017 198

(51) Int. Cl.
*B64D 45/02* (2006.01)
*B32B 7/02* (2019.01)
(Continued)

(52) U.S. Cl.
CPC ............. *B64D 45/02* (2013.01); *B32B 5/00* (2013.01); *B32B 5/02* (2013.01); *B32B 7/00* (2013.01); *B32B 7/02* (2013.01); *B32B 7/10* (2013.01); *B32B 9/00* (2013.01); *B32B 9/04* (2013.01); *B32B 15/00* (2013.01); *B32B 15/04* (2013.01); *B32B 15/20* (2013.01);
(Continued)

(58) Field of Classification Search
CPC ......... B32B 15/00; B32B 15/04; B32B 15/20; B32B 62/00; B32B 2307/56; B32B 2605/18; B32B 7/00; B32B 2262/00; B32B 2262/10; B32B 2262/103; B32B 2262/106; B32B 2307/202; B32B 2307/212; B32B 2307/20; B32B 5/00; B32B 5/02; B32B 7/10; B64D 45/02
USPC ......................................................... 244/1 A
See application file for complete search history.

(56) References Cited

U.S. PATENT DOCUMENTS 6,460,240 B1    10/2002  Kielies et al.
6,762,237 B2 *   7/2004  Glatkowski ............ B82Y 10/00
                                              524/495
(Continued)

FOREIGN PATENT DOCUMENTS

EP    1767344    3/2007
EP    2432634    3/2012
(Continued)

OTHER PUBLICATIONS

German Search Report, dated Jul. 28, 2015.
Katalogauszig: Faserverstaerkung aus Glasfaser., 2013.
European Search Report; priority document.

*Primary Examiner* — Camie S Thompson
(74) *Attorney, Agent, or Firm* — Greer, Burns & Crain, Ltd.

(57) ABSTRACT

A structural element, in particular for an aircraft, such as an airplane, contains a laminate having a plurality of layers made of a fiber composite plastics material with carbon fibers, a lightning protection layer and optionally an electrically insulating dielectric protection layer. The laminate contains at least one hybrid layer, which comprises a carbon fiber-absorption fiber composite, the elongation at break of the absorption fiber being greater than the elongation at break of the carbon fibers.

22 Claims, 1 Drawing Sheet

(51) Int. Cl.
- *B32B 15/20* (2006.01)
- *B32B 7/10* (2006.01)
- *B32B 5/02* (2006.01)
- *B32B 15/04* (2006.01)
- *B32B 15/00* (2006.01)
- *B32B 5/00* (2006.01)
- *B32B 9/00* (2006.01)
- *B32B 9/04* (2006.01)
- *B32B 7/00* (2019.01)

(52) U.S. Cl.
CPC ....... *B32B 2262/00* (2013.01); *B32B 2262/10* (2013.01); *B32B 2262/103* (2013.01); *B32B 2262/106* (2013.01); *B32B 2307/20* (2013.01); *B32B 2307/202* (2013.01); *B32B 2307/212* (2013.01); *B32B 2307/50* (2013.01); *B32B 2307/56* (2013.01); *B32B 2307/732* (2013.01); *B32B 2605/00* (2013.01); *B32B 2605/18* (2013.01)

(56) References Cited

U.S. PATENT DOCUMENTS

| | | |
|---|---|---|
| 2005/0181203 A1 | 8/2005 | Rawlings et al. |
| 2007/0093163 A1* | 4/2007 | Brown .................... B29C 70/78 |
| | | 442/229 |
| 2009/0176112 A1 | 7/2009 | Kruckenberg et al. |
| 2010/0090061 A1 | 4/2010 | Kolax |
| 2011/0031350 A1 | 2/2011 | Sayilgan |
| 2011/0236622 A1 | 9/2011 | Tacke |
| 2012/0063050 A1 | 3/2012 | Langone et al. |
| 2012/0313307 A1* | 12/2012 | Cartwright ............... C08J 5/042 |
| | | 267/141 |
| 2013/0048331 A1 | 2/2013 | Fornes et al. |
| 2014/0011414 A1* | 1/2014 | Kruckenberg ............ B32B 5/16 |
| | | 442/181 |

FOREIGN PATENT DOCUMENTS

| | | |
|---|---|---|
| EP | 2610057 | 7/2013 |
| EP | 2660385 | 11/2013 |
| EP | 2675030 | 12/2013 |

* cited by examiner

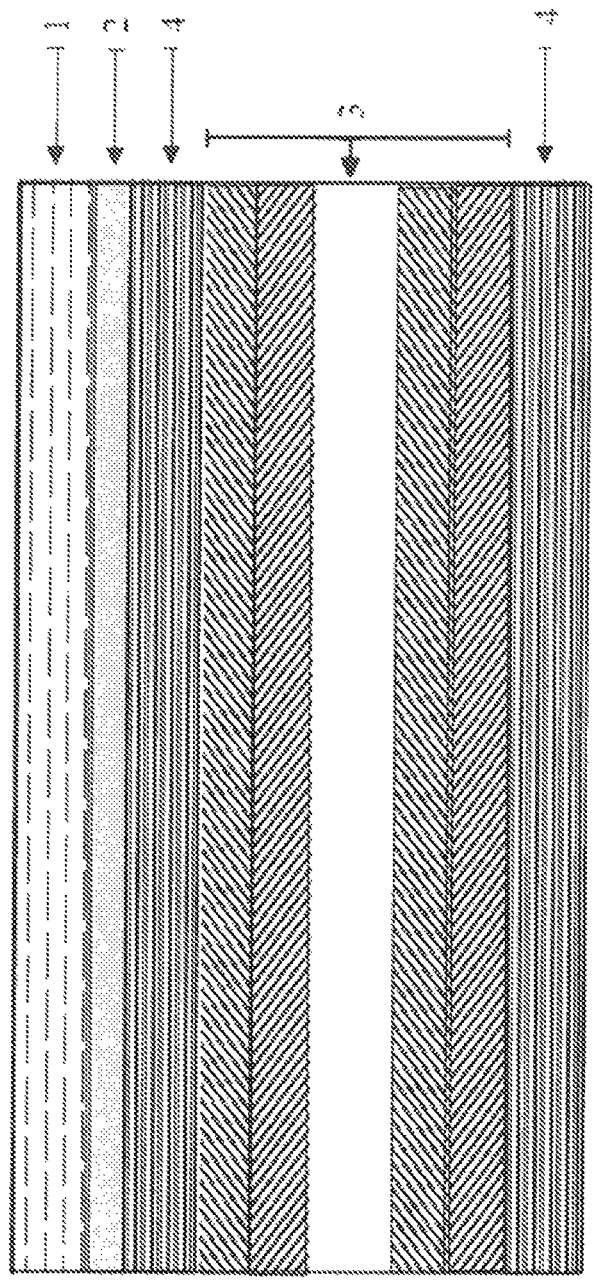

STRUCTURAL ELEMENT

CROSS-REFERENCES TO RELATED APPLICATIONS

This application claims the benefit of the German patent application No. 102014017198.1 filed on Nov. 21, 2014, the entire disclosures of which are incorporated herein by way of reference.

FIELD OF THE INVENTION

The invention relates to a structural element, in particular for an aircraft.

BACKGROUND OF THE INVENTION

In particular, in the case of structural elements situated on the outside of an aircraft, precautionary measures against lightning strikes must generally be taken.

In the event of a lightning strike, first a dart leader plasma channel is formed (streamer-leader formation) and this is followed by a high current discharge (lightning discharge/return stroke). The high current discharge process is connected to a high current flow and introduction of heat into the directly affected CFRP structure. The lightning strike-induced current load associated with the individual zones of an aircraft is specified, e.g., in the EUROCAE ED-84 standard. This does not differentiate between CFRP structures and metallic structures.

Since the thermal conductivity and electrical conductivity of CFRP is significantly lower than that of metals, CFRP structures must be given greater protection than metals. As a standard lighting protection measure, an expanded copper film is applied to the CFRP structure as a lightning protection layer, which serves to conduct away the electric current and the heat. Due to the presence of doubly curved structures, the use of expanded metal foil has been found to be necessary.

It has been found that, in particular in the case of lacquered CFRP structures, lightning strike-induced mechanical damage is substantially due to the lightning protection layer exploding. A non-conductive, dielectric lacquer of this kind is applied to the outside of the structure comprising the metal foil, in order to protect against environmental influences. This explosion of the lightning protection layer comprises an explosion of the copper itself, and of the epoxy resin matrix, by means of which the expanded copper foil is laminated onto the CFRP structure. In the case where a lightning protection layer is not of a sufficient size, the strike current penetrates into the CFRP structure and subsequently the epoxy resin matrix of the carbon fiber composite structure explodes. The explosion of the lightning protection and/or the epoxy resin matrix is caused by the direct heat of the plasma channel and the Joule heat of the lightning protection.

Due to the physical properties of insulating, dielectric layer systems, a concentration or constriction of the plasma channel occurs at the base of the plasma channel during a lightning strike. Insulating, dielectric layer systems also prevent the base of the lightning channel from uniformly sliding over the surface of the structure and thus prevent an even distribution of the heat load and current load over a larger surface area of the structure. The plasma channel can thus remain longer at the point of the lightning strike and thereby cause greater damage to the structure underneath.

To improve the lightning protection it has been proposed that electrically insulating layers be provided under the outer lacquer, but above the lightning protection layer. It has further been proposed that the CFRP structure be protected by means of electrically insulating layers, such as layers comprising glass fibers, arranged underneath the lightning protection layer. However, measures of this type showed little effect or even sometimes increased the mechanical damage in the CFRP structure. By way of example, printed prior art in the field of wind turbines, and in particular in relation to the rotor blades thereof, is known from DE 10 2010 017 62 A1. For lightning protection, the rotor blade comprises, at least in part, a fiber composite plastics material, having solid metal inserts, but not metal fibers, embedded in the matrix of the fiber composite plastics material.

Furthermore, measures have been proposed for greatly increasing the electrical conductivity of the lacquer layer and/or the CFRP structure. However, this has led to no or at most negligible effects, since improved conduction of the lightning would only occur at such a conductivity of CFRP, which would correspond to the conductivity of metals such as copper or aluminum and thus is practically impossible to implement.

SUMMARY OF THE INVENTION

The problem addressed by the invention is that of providing a structural element for an aircraft that overcomes the disadvantages of the prior art, and in particular that of improving lightning protection of components made from CFRP and preventing or at least reducing mechanical damage to the CFRP structure in the event of a lightning strike.

A structural element according to the invention, which is provided in particular for an aircraft such as an airplane, contains a laminate that has a plurality of layers made from a fiber composite plastics material comprising carbon fibers and a lightning protection layer. The laminate contains at least one hybrid layer comprising a carbon fiber-absorption fiber composite, the elongation at break of the absorption fiber being greater than the elongation at break of the carbon fibers.

One idea of the invention is based on the finding that the known lightning protection measures cannot completely prevent the lightning protection layer and/or the epoxy resin matrix of the carbon fiber composite from exploding. This explosion in the µs range (during the rise time of the transient lightning current components A or D according to the EUROCAE ED-84 standard) causes shock waves which cause considerable mechanical damage to the CFRP structure, similar to that caused by a high-speed impact. The individual CFRP layers are substantially delaminated and the epoxy resin matrix is fractured. In particular, in the case of thick dielectric coatings of the CFRP structure, a fracture occurs and thus mechanical damage may be caused to the whole CFRP structure, since the laminate can no longer bear any mechanical loads due to the carbon fibers being fractured.

It is proposed to strengthen the laminate using at least one hybrid layer. The greater elongation at break of the absorption fibers and the more ductile behavior associated therewith bring about a better absorption of the energy of the shockwaves caused by an explosion of the lightning protection layer or the epoxy resin matrix. This leads to the whole CFRP structure being mechanically less badly damaged in the event of a lightning strike. Even a fracture of individual carbon fibers does not lead to catastrophic mechanical damage of the CFRP structure since the absorption fibers of the at least one hybrid layer produce a sufficient residual strength of the CFRP structure. Furthermore, the remaining, conventional CFRP individual layers of the laminate are less badly damaged because of the energy of the shockwaves being absorbed in the at least one hybrid layer.

The absorption fibers may contain steel fibers, in particular stainless steel fibers, or the absorption fibers are steel fibers, in particular stainless steel fibers. These fibers have a greater elongation at break than the carbon fibers; the elongation at break of the stainless steel fibers is, e.g., three to five times greater than that of the carbon fibers. The ductile behavior of the CFRP structure is thus considerably increased. A particularly high absorption of the energy of the shockwaves caused by an explosion of the lightning protection later or the epoxy resin matrix is therefore achieved. This leads to the whole CFRP structure being mechanically more stable and significantly less damaged in the event of a lightning strike.

A hybrid layer made from a carbon fiber-steel fiber composite, in particular from a carbon fiber-stainless steel fiber composite, in addition has the advantage, due to the high electrical and thermal conductivity of steel fibers, in particular stainless steel fibers, that the probability and/or intensity of the explosion of the epoxy resin matrix of the carbon fiber composite is reduced, since less Joule heat is generated and the heat generated is conducted away more quickly.

According to some embodiments of the invention, a top layer of the laminate is formed by the hybrid layer.

According to further embodiments, a bottom layer of the laminate is formed by the hybrid layer. In both cases, which can advantageously be combined with one another, the advantages of the invention described above are particularly effective due to the proximity to the top or bottom surface of the structural element.

According to one embodiment of the invention, the hybrid layer is formed of a unidirectional layer, a braid, an interlaid scrim and/or a woven fabric made of carbon fibers and absorption fibers. The described effects and advantages are achieved irrespective of the precise geometry or inner structure of the hybrid layer and therefore the carbon fibers and absorption fibers of the hybrid layer.

According to another embodiment of the invention, the lightning protection layer contains a metallic foil, in particular, made of copper or a copper base alloy.

The structural element can comprise an electrically insulating, dielectric protection layer. The dielectric protection layer is designed, in particular, to protect against external threats and environmental influences. According to some embodiments of the invention, an electrically insulating, dielectric protection layer is understood, in particular, as a protection layer, the electrical conductivity of which is less than 10-6 S/m when measured at ambient temperature.

It can furthermore be advantageous, e.g., in order to protect the CFRP structure against environmental influences, for the electrically insulating, dielectric layer to be arranged above the lightning protection layer. In this context, "above" means the direction further towards the outer surface of the structural element, which would be more likely to be affected in the event of a lightning strike.

According to further embodiments of the invention, all layers of the laminate are hybrid layers comprising a carbon fiber-absorption fiber composite. This results in particularly significant use being made of the described effect of the absorption of shockwaves in the structural element and can thus prevent or at least reduce particularly heavy damage. This variant is conceivable in that case of CFRP structures which are particularly at risk, for example since these are particularly exposed or delicate.

According to another embodiment, only every nth layer of the laminate is a hybrid layer, n being a natural whole number. Thus, for example every second or every third layer of the laminate can comprise carbon fiber-absorption fiber composite (hybrid layer) rather than carbon fiber composite.

Any other desired combination of hybrid layers comprising carbon fiber-absorption fiber composite, having carbon fiber composite layers, is also included in the invention.

According to an embodiment of the invention, the insulating, dielectric layer contains carbon short fibers, CNTs or other electrically conductive allotropes of carbon, the fraction of the allotropes of carbon being below the percolation threshold. The electrical dielectric strength of the dielectric layer is reduced by the allotropes of carbon. This can advantageously reduce the dwell time of the lightning channel at a fixed point of the surface of the structural element, and therefore also reduce the locally introduced heat energy and the electrical strike current. The expansion of the plasma channel by means of reducing the dielectric strength causes the current flow of the heat introduction to be distributed over a larger surface area, resulting in a reduced thermal load of the fiber composite structure in the region of the base. The power supplied per surface area and thus the thermo-mechanical damage to the CFRP structure is therefore reduced.

BRIEF DESCRIPTION OF THE DRAWINGS

Some embodiments of the invention will be described in further detail in the following, with reference to a FIGURE. The FIGURE schematically shows the layer structure of a structural element according to some embodiments of the invention (the structure of which can be both planar and curved).

DETAILED DESCRIPTION OF THE PREFERRED EMBODIMENTS

A structural element according to some embodiments of the invention is a fuselage element of an airplane, which is basically constructed from a laminate made of layers of carbon fiber composite plastics material 3. The matrix material is an epoxy resin. The top and bottom layer of the laminate comprises a hybrid layer 4, which comprises a carbon fiber-absorption fiber composite. The absorption fibers in this particular example are steel or stainless steel fibers. An expanded copper foil is laminated on the top hybrid layer 4 as a lightning protection layer 2. An electrically insulating dielectric protection layer 1 is applied on top of this. If the airplane is struck by lightning during the flight, and the structural element is struck, an explosion of the lightning protection layer results. However, the 3 to 5 times greater elongation at break of the stainless steel fibers in comparison to the carbon fibers of the laminate produces a better absorption of the energy of the shockwaves caused by an explosion of the lightning protection layer or the epoxy resin matrix. This leads to the whole CFRP structure being less badly damaged by the lightning strike. Although the carbon fibers break down, this does not lead to the whole CFRP structure being catastrophically mechanically damaged. Furthermore, the electrical and thermal conductivity of the stainless steel fibers in the hybrid layers 4 achieves considerably reduced thermal damage. The repair costs of the damaged structural element according to the invention would be significantly lower than if it were constructed conventionally. The described effects furthermore allow the copper foil, which evenly distributes the strike current and the heat introduced by the plasma channel, to be designed to be thinner than is conventional. A portion of the weight is therefore saved which would be conventionally necessary for the lightning protection.

According to a variant of the embodiment (not explicitly shown), in addition to the top and bottom hybrid layer 4, every fourth layer of the CFRP structure is also replaced by a hybrid layer.

According to a further variant, the insulating, dielectric protection layer 1 contains allotropes of carbon, the fraction of the carbon short fibers being below the percolation threshold. According to the embodiment, this further reduces the thermal and mechanical damage of the structural element according to the invention.

It can be advantageous to provide the whole fuselage with structural elements of the invention, or also regions that are particularly at risk from lightning strike, e.g., in the region of the fuselage or of the airfoil.

The invention relates to a structural element, in particular for an aircraft, such as an airplane, which contains a laminate comprising a plurality of layers made of a fiber composite plastics material comprising carbon fibers, a lightning protection layer and optionally an electrically insulating dielectric protection layer. According to some embodiments of the invention, the laminate contains at least one hybrid layer, which comprises a carbon fiber-absorption fiber composite, the elongation at break of the absorption fiber being greater than the elongation at break of the carbon fibers.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural element comprising:
a laminate comprising a plurality of layers made of a fiber composite plastics material comprising carbon fibers, and a lightning protection layer,
wherein the laminate additionally contains at least one hybrid layer, which comprises a carbon fiber-absorption fiber composite, the elongation at break of the absorption fiber being greater than the elongation at break of the carbon fibers, further comprising an electrically insulating dielectric protection layer, and
wherein a topmost layer of the laminate is formed by the hybrid layer.

2. The structural element according to claim 1, wherein the absorption fibers are steel fibers.

3. The structural element according to claim 1, wherein the absorption fibers are stainless steel fibers.

4. The structural element according to claim 1, wherein the hybrid layer is formed of one of a unidirectional layer, a braid, an interlaid scrim or a woven fabric made of carbon fibers and absorption fibers.

5. The structural element according to claim 1, wherein the lightning protection layer contains a metallic foil.

6. The structural element according to claim 1, wherein the electrically insulating dielectric protection layer is arranged above the lightning protection layer.

7. The structural element according to claim 1, wherein all layers of the laminate, not including the lightning protection layer, are hybrid layers which comprise a carbon fiber-absorption fiber composite.

8. The structural element according to claim 1, wherein every n-th layer of the laminate is a hybrid layer, n being a natural whole number.

9. The structural element of claim 1, wherein the structural element comprises a fuselage element of an aircraft.

10. The aircraft of claim 1, wherein the lightning protection layer is arranged between the electrically insulating dielectric protection layer and the laminate comprising a plurality of layers made of a fiber composite plastics material comprising carbon fibers and at least one hybrid layer.

11. The structural element of claim 10, wherein at least one hybrid layer is directly adjacent to the lightning protection layer.

12. A structural element comprising:
a laminate comprising a plurality of layers made of a fiber composite plastics material comprising carbon fibers, and a lightning protection layer,
wherein the laminate additionally contains at least one hybrid layer, which comprises a carbon fiber-absorption fiber composite, the elongation at break of the absorption fiber being greater than the elongation at break of the carbon fibers, further comprising an electrically insulating dielectric protection layer, and
wherein a bottommost layer of the laminate is formed by the hybrid layer.

13. A structural element comprising:
a laminate comprising a plurality of layers made of a fiber composite plastics material comprising carbon fibers, and a lightning protection layer,
wherein the laminate additionally contains at least one hybrid layer, which comprises a carbon fiber-absorption fiber composite, the elongation at break of the absorption fiber being greater than the elongation at break of the carbon fibers, further comprising an electrically insulating dielectric protection layer,
wherein the insulating, dielectric layer contains allotropes of carbon, the fraction of the allotropes of carbon being below the percolation threshold.

14. The structural element according to claim 13, wherein the allotropes of carbon contain at least one of carbon short fibers or CNTs.

15. A structural element comprising:
a laminate comprising a plurality of layers made of a fiber composite plastics material comprising carbon fibers, and a lightning protection layer,
wherein the laminate additionally contains at least one hybrid layer, which comprises a carbon fiber-absorption fiber composite, the elongation at break of the absorption fiber being greater than the elongation at break of the carbon fibers, further comprising an electrically insulating dielectric protection layer,
wherein the electrically insulating dielectric protection layer is arranged above the lightning protection layer
wherein the metallic foil is made of copper or a copper base alloy.

16. An aircraft comprising:
structural element comprising:

a laminate comprising a plurality of layers made of a fiber composite plastics material comprising carbon fibers, and a lightning protection layer, wherein the laminate additionally contains at least one hybrid layer, which comprises a carbon fiber-absorption fiber composite, the elongation at break of the absorption fiber being greater than the elongation at break of the carbon fibers, further comprising an electrically insulating dielectric protection layer, and wherein a topmost layer of the laminate is formed by the hybrid layer.

17. The aircraft of claim 16, wherein the structural element comprises a fuselage element of the aircraft.

18. The structural element of claim 16, wherein the lightning protection layer is arranged between the electrically insulating dielectric protection layer and the laminate comprising a plurality of layers made of a fiber composite plastics material comprising carbon fibers and at least one hybrid layer.

19. The aircraft of claim 18, wherein at least one hybrid layer is directly adjacent to the lightning protection layer.

20. An aircraft comprising:

a structural element comprising:

a laminate comprising a plurality of layers made of a fiber composite plastics material comprising carbon fibers, and a lightning protection layer, wherein the laminate additionally contains at least one hybrid layer, which comprises a carbon fiber-absorption fiber composite, the elongation at break of the absorption fiber being greater than the elongation at break of the carbon fibers, further comprising an electrically insulating dielectric protection layer, and wherein a bottommost layer of the laminate is formed by the hybrid layer.

21. An aircraft comprising:

a structural element comprising:

a laminate comprising a plurality of layers made of a fiber composite plastics material comprising carbon fibers, and a lightning protection layer, wherein the laminate additionally contains at least one hybrid layer, which comprises a carbon fiber-absorption fiber composite, the elongation at break of the absorption fiber being greater than the elongation at break of the carbon fibers, further comprising an electrically insulating dielectric protection layer, and wherein the insulating, dielectric layer contains allotropes of carbon, the fraction of the allotropes of carbon being below the percolation threshold.

22. An aircraft comprising:

a structural element comprising:

a laminate comprising a plurality of layers made of a fiber composite plastics material comprising carbon fibers, and a lightning protection layer, wherein the laminate additionally contains at least one hybrid layer, which comprises a carbon fiber-absorption fiber composite, the elongation at break of the absorption fiber being greater than the elongation at break of the carbon fibers, further comprising an electrically insulating dielectric protection layer, wherein the electrically insulating dielectric protection layer is arranged above the lightning protection layer wherein the metallic foil is made of copper or a copper base alloy.

* * * * *